United States Patent [19]

Strub

[11] 3,988,897

[45] Nov. 2, 1976

[54] APPARATUS FOR STORING AND RE-UTILIZING ELECTRICAL ENERGY PRODUCED IN AN ELECTRIC POWER-SUPPLY NETWORK

[75] Inventor: Rene Strub, Winterthur, Switzerland

[73] Assignee: Sulzer Brothers, Limited, Winterthur, Switzerland

[22] Filed: Sept. 3, 1975

[21] Appl. No.: 610,055

[30] Foreign Application Priority Data
Sept. 16, 1974 Switzerland.................. 12561/74
July 16, 1975 Switzerland..................... 9295/75

[52] U.S. Cl.................................... 60/682; 60/398; 60/413; 60/652; 60/659; 417/243; 417/244
[51] Int. Cl.²....................... F02C 1/04; F02C 9/00
[58] Field of Search............ 60/650, 652, 682, 398, 60/39.67; 417/243, 244, 247

[56] References Cited
UNITED STATES PATENTS
3,699,681   10/1972   Frutschi............................ 60/682

Primary Examiner—Allen M. Ostrager
Attorney, Agent, or Firm—Kenyon & Kenyon Reilly Carr & Chapin

[57] ABSTRACT

The output of at least the lowest-pressure turbo-compressor is connected via the intermediate cooler of the compressor group to the input of the turbo-compressor and a throttling means is placed in the conduit between the compressor output and cooler. The looping of the output to the input is effected to diminish the starting and idling power of the compressor group. Charging of the compressed air storage chamber is prevented by a check valve until the pressure of the pressure chamber is exceeded in the compressor group.

7 Claims, 4 Drawing Figures

APPARATUS FOR STORING AND RE-UTILIZING ELECTRICAL ENERGY PRODUCED IN AN ELECTRIC POWER-SUPPLY NETWORK

This invention relates to an apparatus for storing energy produced in an electric power-supply network and for reutilizing the stored energy during peak loads of the network.

As is known, various types of equipment have been used to store energy produced in an electric power-supply network for subsequent retrieval during peak-load periods. Generally, the power storage has been accomplished by means of a group of compressors consisting of at least two multistage turbocompressors connected in series over intermediate coolers and coupled to one another for pumping compressed air into a storage chamber during a charging period. The equipment furthermore has included an electric machine which either, during the charging of the compressed-air storage chamber, serves as a motor for driving the compressor group, or during the discharge of the storage chamber, serves as a generator for supplying the electric network. The equipment furthermore has used a gas turbine, which can be coupled to and uncoupled from the electric machine for driving the electric machine while using the stored compressed air.

Storage equipment of this kind serves chiefly for the immediate compensation of rapidly occurring load variations in large electric power-supply networks, until the output of the main plant can be adapted to a changed load condition. However, up to the present time, during the starting-up of such equipment for a storage operation, air not yet compressed by the compressor group up to the storage pressure had to be blown through throttling devices into the atmosphere. This in turn has led to a noisy disturbance of the surrounding environment.

Accordingly, it is an object of the invention to avoid noise in systems which use compressed air in storing energy from an electric power-supply network.

It is another object of the invention to keep the amount of power taken from an electrical power-supply network as small as possible until storage pressure is reached in a compressed air storage chamber for storing excess energy.

It is another object of the invention to maintain a minimum of idling power in a compressor group of an energy storing apparatus when not charging.

Briefly, the invention is directed to an apparatus for storing energy produced in an electric power-supply network and for re-utilizing the stored energy during peak loads of the network. This apparatus comprises a compressor group including at least two multistage turbo-compressors connected in series for compressing a flow of air, a compressed-air storage chamber for receiving compressed air from the compressor group, an electric machine to function as a motor for driving the compressor group to deliver compressed air to the storage chamber, a gas turbine selectively coupled to the electric machine for driving the electric machine as a generator during a discharge of air from the storage chamber to supply electric energy to the network, and a cooler connected in series between the two turbo-compressors for cooling a flow of compressed air therebetween. The invention provides such an apparatus with a means of looping the air compressed in at least the lowest-pressure turbo-compressor from the output to the input via the cooler.

In this respect, the apparatus includes a first conduit connected to an output of the lowest-pressure turbo-compressor of the compressor group and to the cooler to deliver compressed air thereto, a second conduit connected between the cooler and an input of the lowest-pressure turbo-compressor to deliver the air pumped from the output of the lowest-pressure turbo-compressor to the input thereof, and a throttling means such as a control valve in the first conduit.

The apparatus also has a supply line to the input of the lowest-pressure turbo-compressor which is provided with a throttling means such as a control valve for controlling and, in some instances, blocking the flow of air to the compressor group.

The lowest-stage compressor may also be equipped with adjustable stator-blades. Also, at least the higher-stage turbocompressor may be provided with a loop means which runs from the output end of the compressor over a throttling means and to air intermediate cooler following the compressor. The output end of the last turbocompressor may also be connected by means of a loop over an end-cooler and a following throttling means with the input end.

These and other objects and advantages of the invention will become more apparent from the following detailed description and appended claims taken in conjunction with the accompanying drawings in which:

Figure 1:
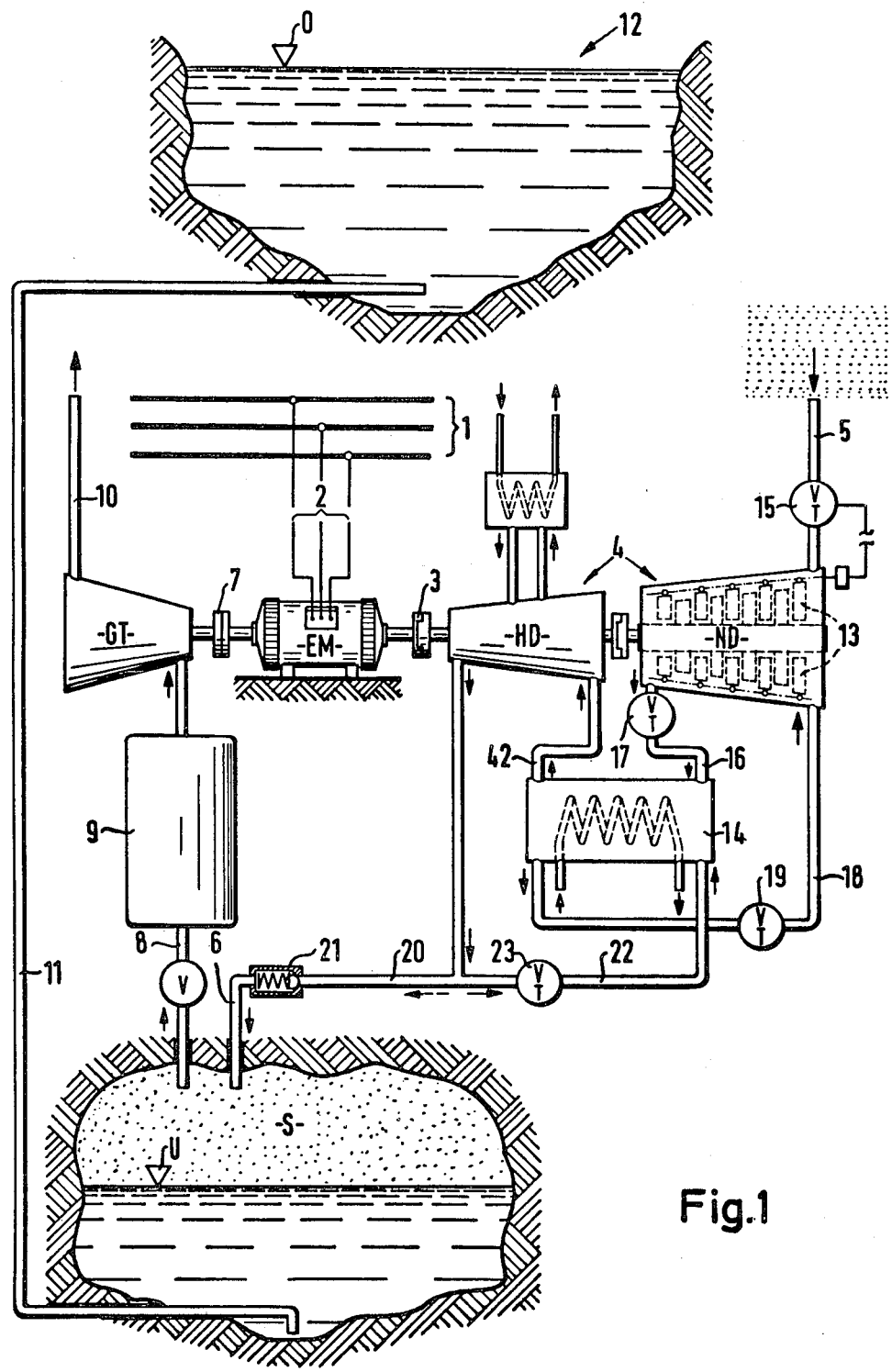
FIG. 1 illustrates a schematic view of an apparatus of the invention with a two-stage compressor group.

Referring to FIG. 1, the energy-storing apparatus serves to compensate rapidly occurring brief load variations in an electric power-supply network 1. The apparatus has an electric machine EM which is connected by means of a conductor 2 to the network 1. During the storage of energy, the electric machine EM acts as a motor, and at the delivery of stored energy acts as a generator. This electric machine EM is coupled by means of a coupling in uncoupable fashion with a compressor group 4 at a standstill. The group 4 serves for compressing air sucked out of the atmosphere through a supply line 5, which air is conducted in a compressed state through a conduit 6 into a storage chamber S. This storage chamber may, for example, be composed of a natural or artificially-made cavern in the ground or in a mountainous region. With smaller plants, compressed air tanks may also be used. Storage pressures of 30 to 50 atmospheres and higher, e.g. up to 100 atmospheres, may be used in either case.

The electric machine EM is also coupled, or can be disconnected, over a coupling 7 with a gas-turbine GT. When hooked up as a generator, the electric machine EM can transmit energy from the stored compressed air to the network 1. The gas-turbine GT is supplied, over conduit 8, with compressed air from the storage chamber S, which air advantageously initially serves in a combustion chamber 9 for the production of highly-heated gas, to increase the energy which can be fed to the network 1. The exhaust gas from the turbine GT passes through a conduit 10 into the atmosphere.

The storage chamber S is advantageously connected, over a conduit 11 (FIGS. 1 and 2) with a natural or artificial pond 12 at a higher altitude. Thus, the storage pressure can be maintained practically constant until being completely discharged. Thus, the storage pressure corresponds to the difference of height between the water-levels O and U, of the pond 12 and of the chamber S, respectively.

The compressor group 4 of the storage equipment (FIGS. 1 and 2) comprises a low-pressure turbo-compressor ND and a high-pressure turbo-compressor HD connected in series. The low-pressure compressor is equipped with adjustable stator-blades 13, which make an additional contribution to a suitable adjustment of the pumping power or of the drive power of the compressor group 4. An intermediate cooler 14 is also connected between the compressors for cooling of the air flowing into the high-pressure compressor HD.

In order to diminish the starting and idling power of the compressor-group 4, the pumping side, i.e. the output of the turbo-compressor ND (FIG. 1) is connected with the intermediate cooler 14 by a conduit 16 in which a throttling means 17 is interposed. The intermediate cooler 14 is, in turn, connected by a conduit 18 with an input at the input end of the turbocompressor ND. A throttling means 19 such as a blow-off valve, may also be installed in the conduit 18. Furthermore, the output end of the turbo-compressor HD (FIG. 1) is connected, by a conduit 20 having a throttling means 23, with the intermediate cooler 14 and the cooler 14, in turn, by a conduit 42 with the input end of the turbo-compressor HD. The conduit 20 acts as a pumping line which is connected to the supply-line 6 for the storage chamber S over a check-valve 21. The check-valve 21 is closed when starting or idling, and is opened only when pressure in the supply line 20 exceeds the pressure of the storage chamber S, so that the charging of the chamber S may begin. An obturating means 15 is placed in the air supply line 5 so that in a closed state, fresh air from the atmosphere can be prevented or so that a backward emergence of air out of the compressor group into the outside can be prevented.

When starting, and during idling of the compressor group 4, by means of the lowest-stage turbo-compressor ND and the associated loop means 16, 18 which connects the ends of the ND compressor with one another, a regulated cooled circuit is maintained through the intermediate cooler 14. With suitable adjustment of the throttling means, it is possible to decrease the power for starting or idling substantially.

Figure 2:
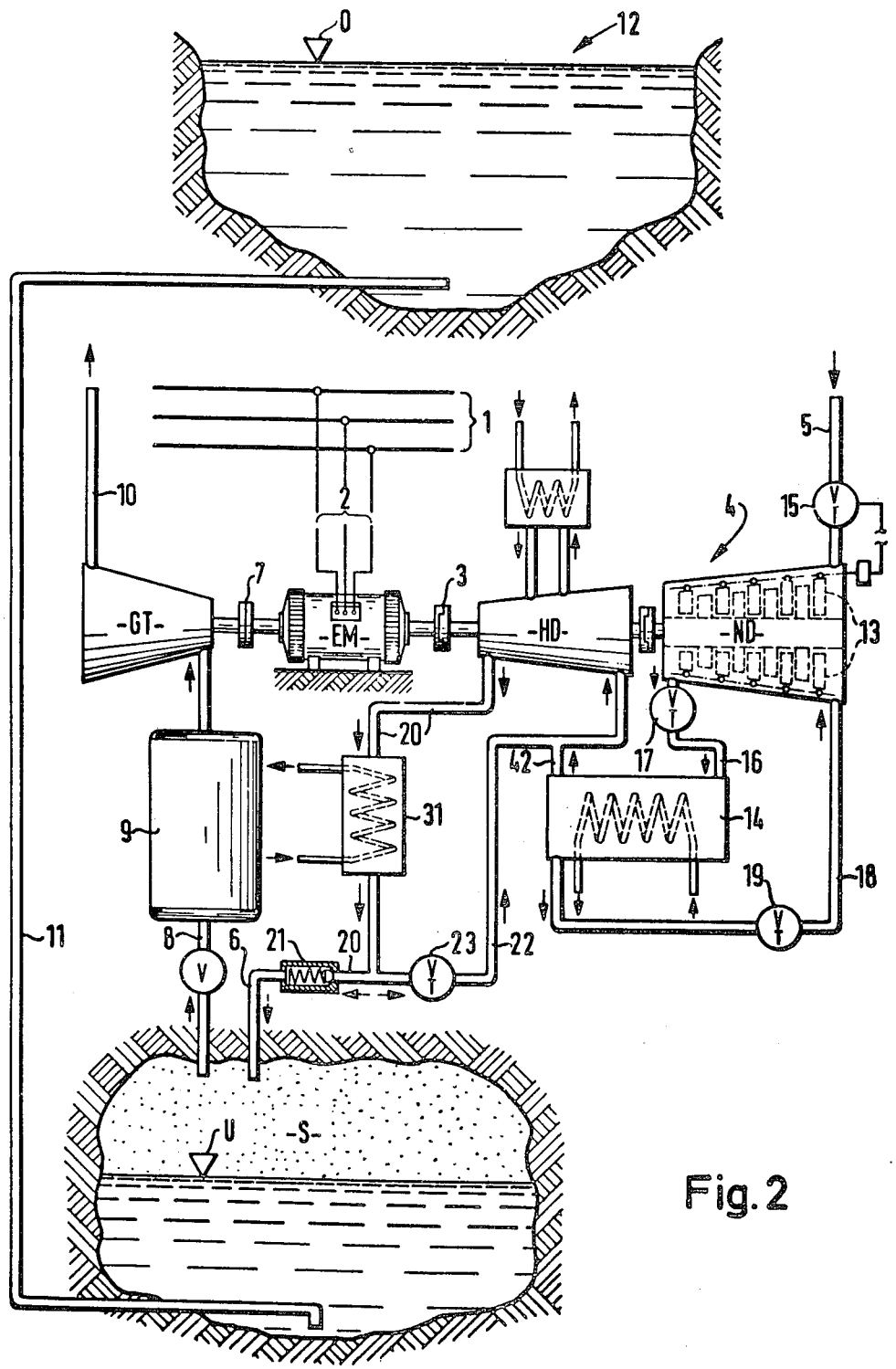
FIG. 2 illustrates a schematic view of an apparatus similar to that of FIG. 1 but with a modified hook-up of the intermediate cooler.
Figure 3:
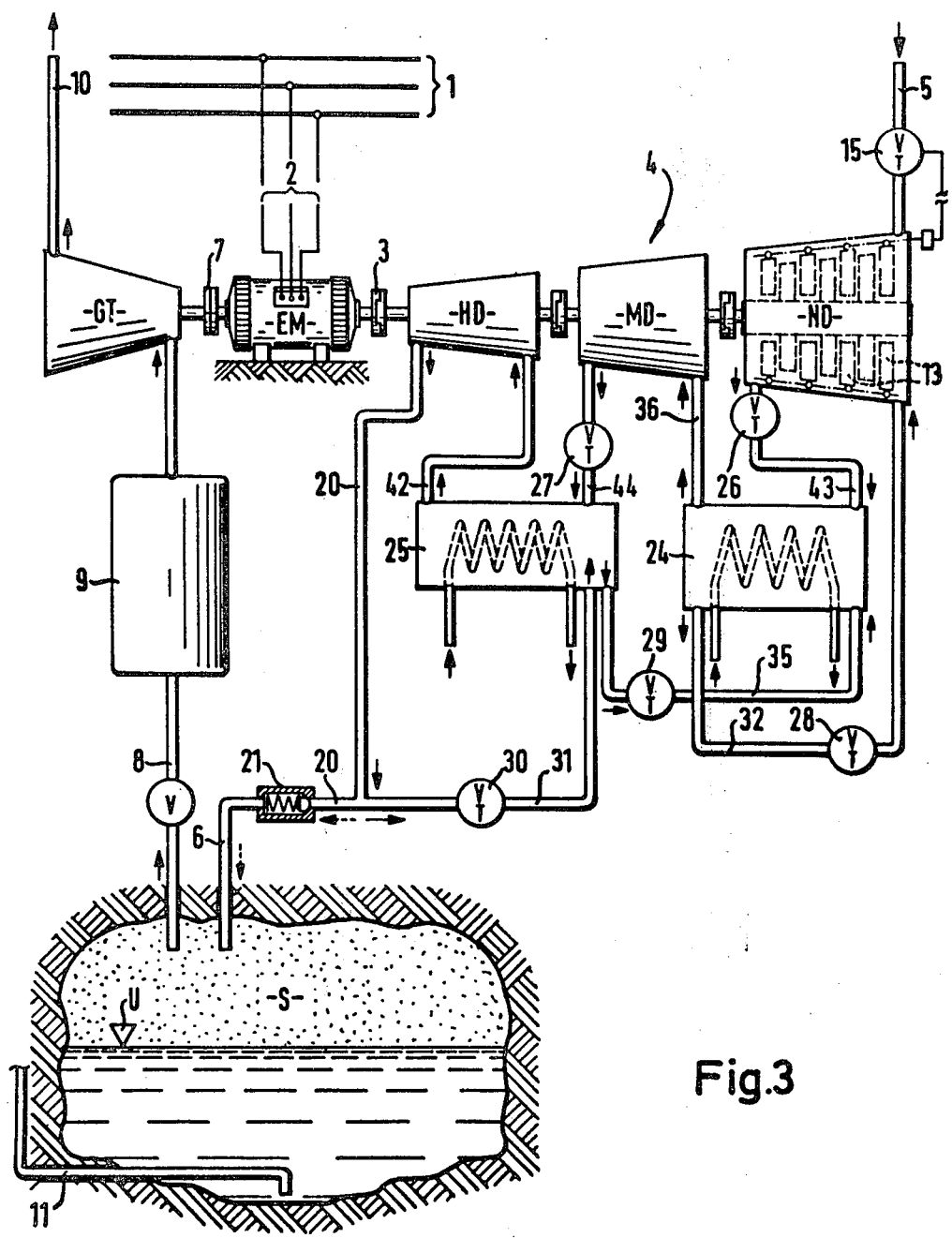
FIG. 3 illustrates a schematic view of an apparatus with a three stage compressor group.
Figure 4:
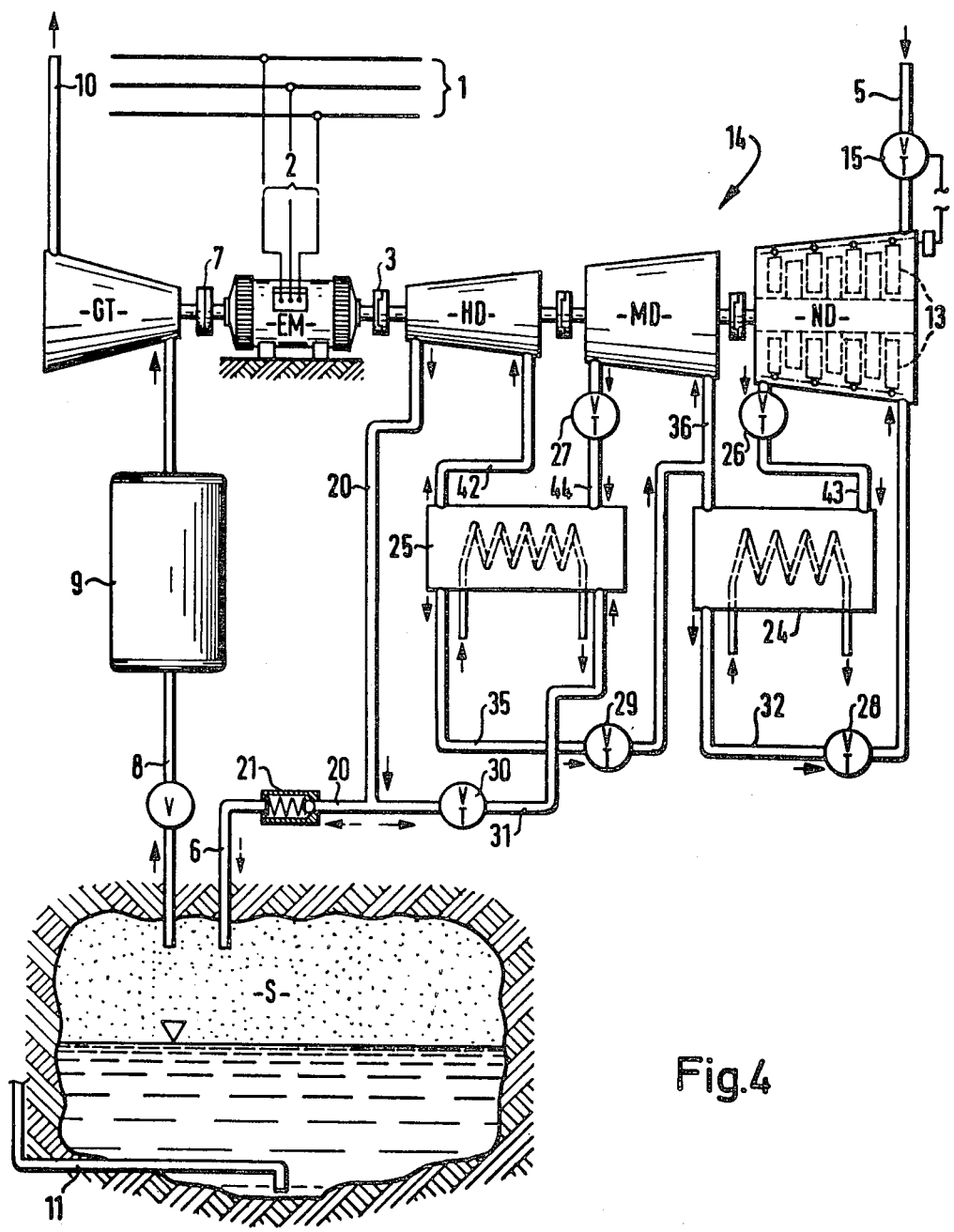
FIG. 4 illustrates a schematic view of an apparatus similar to that of FIG. 3 but with a modified hook-up of the intermediate cooler.

Referring to FIGS. 2, 3 and 4, wherein like reference characters have been used to indicate like parts as above, the overall plants can be modified to include one or more coolers, one or more turbo-compressors and the like. Further, as shown in FIG. 2, the output conduit 20 of the higher-pressure turbocompressor HD has an end cooler 31 incorporated therein which acts as a heat exchanger for the combustion gases in the combustion chamber 9. Also, the conduit 22, instead of returning the flow to the cooler 14, returns the flow into the input of the highest-pressure turbo-compressor HD via the conduit 42.

Referring to FIGS. 3 and 4, the compressor group 4 has three compressors ND, MD and HD with an intermediate cooler 24, 25 between the low-pressure compressor ND and the mediumpressure compressor MD, and between the medium-pressure compressor MD and the high-pressure compressor HD. In order to effect a circuit, the output end of each of the compressors ND, MD, HD, is connected with the input end over one of the two intermediate coolers 24 or 25 by conduits 43–32; 44–35–36; and 20–31–42; respectively. The amount flowing round in the circuit, and thus the pressure-rise in the compressor of the stage concerned, can be adjusted as necessary by the throttling means 26; 28 or 27; 29 or 30. By this hook-up, as in the case of the two compressors shown in FIGS. 1 and 2, it is possible to influence the pressure-level in the group of compressors.

It is moreover possible, by means of the higher-stage compressors HD (FIGS. 1 to 4) and MD (FIGS. 3 and 4) using the loop conduits 20, 22, 42 (FIGS. 1 and 2) or 20, 31, 42 and 44, 35, 36 (FIGS. 3 and 4) and by means of the throttling means 23 (FIGS. 1 and 2) or 30 and 27 (FIGS. 3 and 4), to maintain a regulated circuit, which is cooled by the intermediate cooler 14 (FIG. 1) or the end cooler 31 (FIG. 2) or the intermediate coolers 25 and 24 (FIGS. 3 and 4), for the further reduction of the starting and idling power. When the obturating means 15 is also closed, at least the circuit through the low-pressure compressor ND can be reduced below atmospheric pressure. Also, the pressure-pattern in the circuits through the higher-pressure compressors can be reduced a corresponding extent by suitable adjustment of the throttling means 23 (FIGS. 1 and 2) or 30, 29 (FIGS. 3 and 4) (sometimes to below atmospheric pressure). A further additional reduction of the power used can be obtained, while avoiding falling below the pump-limit, by suitable adjustment of the stator blades 13 which can be turned.

It hereby becomes possible to decrease the power needed for starting and also for lengthy idling to a fraction of full power without blowing-off into the atmosphere.

In starting up the compressor equipment (e.g. by the aid of the gas-turbine and the couplings 7, 3) the counter-pressure acting on the check-valve 21 is set in a throttled circuit over the adjustable throttling means 17 (FIGS. 1 and 2) or 26 (FIGS. 3 and 4) and the cooler 14 or 24. If the obturating means 15 is completely closed and the stator blades 13 are set for the minimum flow-through section, then a rise of pressure will occur in the individual stages of the compressor group as far as the check-valve 21 (closed because of the storage chamber counterpressure) at the beginning of the supply-line 6. However, because the obturating means 15 remains closed, this pressure rise in the individual stages of the compressor group depends on the leaks through the stuffing-box labyrinths (not shown) of the individual compressors. A considerable negative pressure will then occur at the input into the lowest-stage compressor. The intermediate pressures between the individual compressors may be adjusted by aid of the throttling means in the loop conduits. (i.e. bypass lines. Because of the influence of a negative pressure at the input into the low-pressure compressor, the power for driving the compressor group is only an insignificant fraction of the full charging power of the compressors. This idling power is, for the most part, converted into heat by compression, turbulence at the throttling places, and friction. This heat is dissipated in the intermediate coolers. The compressor-group can thus be kept operating at full speed without any considerable losses, so that at a drop in power in the electric power-supplying network, the storage apparatus is ready in a minimum of time to produce energy.

During idling operation, a favorable distribution of the pressure between the individual stages of the compressor group can be obtained by means of the throttling means 17, 19, 23 and 26 to 30 in the stage circuits. The negative pressure air sucked in through the stuffing-boxes (not shown) for the most part escapes again through the stuffing-boxes into the stages having above-atmospheric pressure.

When switching over from idling to charging of the storage chamber S, the gas turbine GT is disengaged by means of the coupling 7 from the electric machine EM and, with the obturating means 15 opened and the throttling means [except the valves 17 (FIGS. 1 and 2), 26, 27 (FIGS. 3 and 4)] closed in the circuit lines, the pumping operation can be obtained. Thus, in accordance with the increasing performance of the compressors, there can also be an increase in the energy supplied to the electric machine EM from the network 1 over the conductor 2.

After the storage chamber S is completely charged, the apparatus can be switched over to idling operation of the compressors group. In this case, the compressor group may be kept rotating by the electric machine EM alone. The gas turbine GT remains stopped.

If a power shortage should occur in the electric network 1, then the gas turbine GT can be speeded up in minimum time to operative speed, and when synchronous speed is reached can be coupled by coupling 7 to the electromotor EM. By increasing the gas-turbine power, energy from the electric machine can be supplied to the network 1. Because of the small idling performance of the compressor group, the group does not need to be disengaged from the storage apparatus even when that group is discharging. Thus, at the conclusion of discharge operation, the compressor group is at synchronous speed again ready if necessary to supplement charging of the storage apparatus.

An entry of the compressor operation into the pumping region, on the one hand, and into the choking region, on the other hand, can be greatly prevented by a suitable combination of the adjustment of the throttling means. It is also possible to contribute to this by a suitable adjustment of the stator vanes in the ND compressor.

The disengagable coupling 7 which may be a toothed coupling i.e. a dog clutch between the gas turbine GT and the electric machine EM may be provided with magnetic synchronization. This enables the electric machine EM already running from the network 1 to be coupled, with the running turbine GT. As it is more difficult to couple the running electric machine with the compressor group, it is desirable to use the mechanical coupling 3, which can be disengaged during a standstill, doing this only in extraordinary cases.

The specific characteristic of the valve 17 (FIGS. 1 and 2), or valve 26 (FIGS. 3 and 4) is its disposition between the compressor and the following intermediate cooler. Thus, the throttling heat produced downstream of the valve is immediately carried away into the intermediate cooler and the air flowing back into the compressor ND is cooled. If, during idling, the throttling would occur only after emergence from the intermediate cooler, then the throttling heat is conducted with the air flowing back to the compressor ND and, under certain conditions, is excessively heated.

It is noted that the cooler 14 as shown in FIG. 1 has two inputs through valves 17 and 23 and two outlets through the conduits 42 and 18. By suitably matching the adjustments of the three valves 17, 19, 23, the air pressure in the cooler 14 can be maintained at a level which corresponds to the required intermediate pressure between the inflow pressure into the low pressure compressor ND and the turbocompressor HD at the transition from the low pressure compressor ND into the turbocompressor HD. Also, the quantity forwarded by the compressors is held to that amount at which neither "pumping" nor "choking" occurs when idling. Therefore, when idling, the work needed for the compressor to be run synchronously can be limited to the amount need for the compression of the air leaking in through one stuffing box and emerging again through the other stuffing boxes and for maintaining a stable flow of the circulating air. In this way, stable idling is ensured with minimal quantities. This avoids blowing out into the atmosphere through special blow-off conduits.

What is claimed is:

1. An apparatus for storing energy produced in an electric power-supply network and for re-utilizing the stored energy during peak loads of said network, said apparatus comprising
    a compressor group including at least two multistage turbo-compressors connected in series;
    a compressed-air storage chamber for receiving compressed air from said compressor group;
    an electric machine connected to said compressor group and to said network to function as a motor for driving said compressor group to deliver compressed air to said storage chamber;
    a gas turbine selectively coupled to said electric machine and to said storage chamber for driving said electric machine as a generator during a discharge of air from said storage chamber to supply electric energy to said network;
    a cooler connected in series between said two turbo-compressors for cooling a flow of compressed air therebetween;
    a first conduit connected to an output of the lowest-pressure turbo-compressor of said compressor group and to said cooler to deliver compressed air thereto;
    a second conduit connected between said cooler and an input of said lowest-pressure turbo-compressor to deliver the air pumped from said output of said lowest-pressure turbo-compressor to said input thereof; and
    a throttling means in said first conduit.

2. An apparatus as set forth in claim 1 which further comprises a supply line connected to an input of said lowest-pressure turbo-compressor for supplying air thereto and a throttling means in said supply line for controlling the supply of air.

3. An apparatus as set forth in claim 1 wherein at least said lowest-pressure turbo-compressor has adjustable stator vanes therein.

4. An apparatus as set forth in claim 1 which further comprises a third conduit connected to an output of at least one higher-pressure turbo-compressor of said compressor group and to said cooler to deliver compressed air thereto, a fourth conduit connected from said cooler to an input of said higher-pressure turbo-compressor to deliver cooled compressed air thereto, and a throttling means in said third conduit.

5. An apparatus as set forth in claim 1 which further comprises a second cooler connected in series between a pair of higher-pressure turbo-compressors of said compressor group, a third conduit connected to an output of one of said higher-pressure turbo-compressors and said second cooler to deliver compressed air thereto, a fourth conduit connected from said second cooler to an input of said one of said higher-pressure turbo-compressors to deliver cooled compressed air thereto and a throttling means in said third conduit.

6. An apparatus as set forth in claim 1 which further comprises a third conduit connected to an output end of the highest-pressure turbo-compressor of said compressor group and to an end cooler to deliver compressed air to said end cooler, a fourth conduit connected from said end cooler to an input of said highest-pressure turbo-compressor to deliver cooled compressed air thereto, and a throttling means in said fourth conduit.

7. An apparatus for storing energy produced in an electric power-supply network and for re-utilizing the stored energy during peak loads of said network, said apparatus comprising a compressor group including at least two multi-stage turbo-compressors connected in series;

a compressed-air storage chamber for receiving compressed air from said compressor group;

an electric machine connected to said compressor group and to said network to function as a motor for driving said compressor group to deliver compressed air to said storage chamber;

a gas turbine selectively coupled to said electric machine and to said storage chamber for driving said electric machine as a generator during a discharge of air from said storage chamber to supply electric energy to said network;

a cooler connected in series between said two turbo-compressors for cooling a flow of compressed air therebetween; and means for looping the air compressed in at least the lowest-pressure turbo-compressor of said compressor group from the output thereof to the input thereof through said cooler.

* * * * *